March 14, 1933. E. ASHFORD 1,900,971
APPARATUS FOR CUTTING GLASS TUBING
Filed June 12, 1930 4 Sheets-Sheet 3

March 14, 1933.  E. ASHFORD  1,900,971
APPARATUS FOR CUTTING GLASS TUBING
Filed June 12, 1930   4 Sheets-Sheet 4

Inventor
Ernest Ashford
by Cushman Bryant & Darby
Attorneys

Patented Mar. 14, 1933

1,900,971

UNITED STATES PATENT OFFICE

ERNEST ASHFORD, OF CHARLTON, LONDON, ENGLAND

APPARATUS FOR CUTTING GLASS TUBING

Application filed June 12, 1930, Serial No. 460,671, and in Great Britain June 20, 1929.

This invention relates to improvements in apparatus for cutting glass tubing into lengths by means of a flame.

In apparatus of this kind as hitherto known, the piece of glass tubing to be cut has been rotated by resting it upon rotating metal rollers, and suitable flame jets have been caused to impinge upon those points in length of the tubing where it is to be cut. The parting of the tubing is effected by strains set up in the glass due to the sudden change of temperature of the glass as it moves from contact with the relatively cold rollers to contact with the hot flame.

It has been found that the quality of the cut is adversely effected if for any reason the contact between the rollers and the glass tubing to be cut is not continuous and uniform or if the angle at which the flame impinges upon the surface of the tubing varies, and since practically all glass tubing met with in commerce possesses greater or smaller defects in shape, being either bent or not truly circular in section, it has hitherto proved impossible to obtain a consistently good quality of cut owing to the faulty contact between the glass and the rollers and the variations in the angle at which the flame strikes the surface of the glass due to these defects in shape.

The present invention is directed to the production of an apparatus for cutting glass tubing whereby the difficulties referred to above are overcome, and the apparatus according to the invention therefore comprises means whereby the flame jet is caused to impinge on the surface of a rotating piece of glass tubing at a constant angle. The flame producing nozzle may be mounted so as to move in correspondence with any variations in the shape of the tubing so that the angle at which the flame meets the surface of the tubing remains constant.

For this purpose the jet nozzle may be carried in a holder mounted for pivotal movement, said holder being also connected rigidly with a member which supports a roller or like device which runs on the surface of the rotating tubing and serves to move the holder and jet in accordance with variations in the shape or travel of the tubing surface.

The tubing to be cut, instead of being rotated by the rollers as hitherto, is driven by separate driving means as by clamping it in a rotating chuck for example, and the rollers are rotated by contact with the tubing in the region of the point where the latter is to be cut, the rollers being mounted in yielding bearings which permit the rollers to adjust themselves to accidental or intended variations in the shape of the tubing so as to remain in continuous cooling contact with the surface thereof.

When a length of tubing is to be cut into a number of pieces of similar length means may be provided to feed the tubing intermittently through the chuck and into the cutting position.

An embodiment of the invention is illustrated in the accompanying drawings in which Fig. 1 is an elevation of a machine for cutting glass tubing according to the invention.

Figure 1:
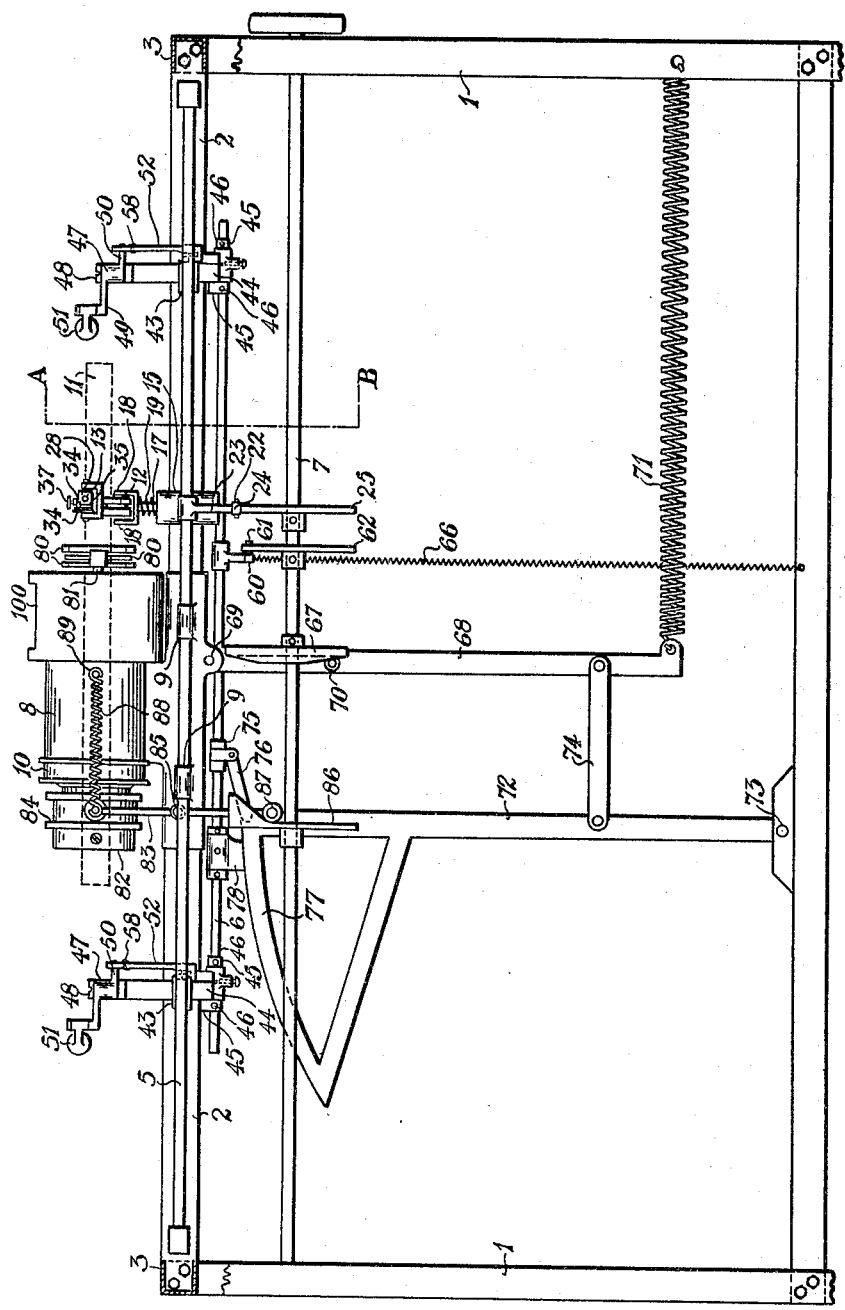

Referring to the drawings, the machine illustrated comprises a supporting framework formed of a number of uprights 1, a pair of longitudinal channel irons 2, cross pieces 3 and bracing members 4.

To the upper part of the framework are secured a pair of parellel guide rods 5 and below and parallel to the guide rods 5 are mounted a bar 6 of square section and a rotatable cam shaft 7, the latter being mounted for continuous rotation in bearings on two of the uprights 1, being driven by any convenient means such as an electric motor (not shown).

At a point about midway of the length of the machine is fixedly mounted a chuck bearing 8, said chuck bearing being secured to the guide rods 5 through lugs 9 formed on the base of the chuck bearing. The chuck 100 rotating within the bearing 8 is fixedly connected with a driving pulley 10, this pulley being driven continuously by a convenient belt from a continuously rotating shaft, not shown, to rotate the chuck 8 and thereby a length of glass tubing 11 held therein to be cut.

Figure 2:
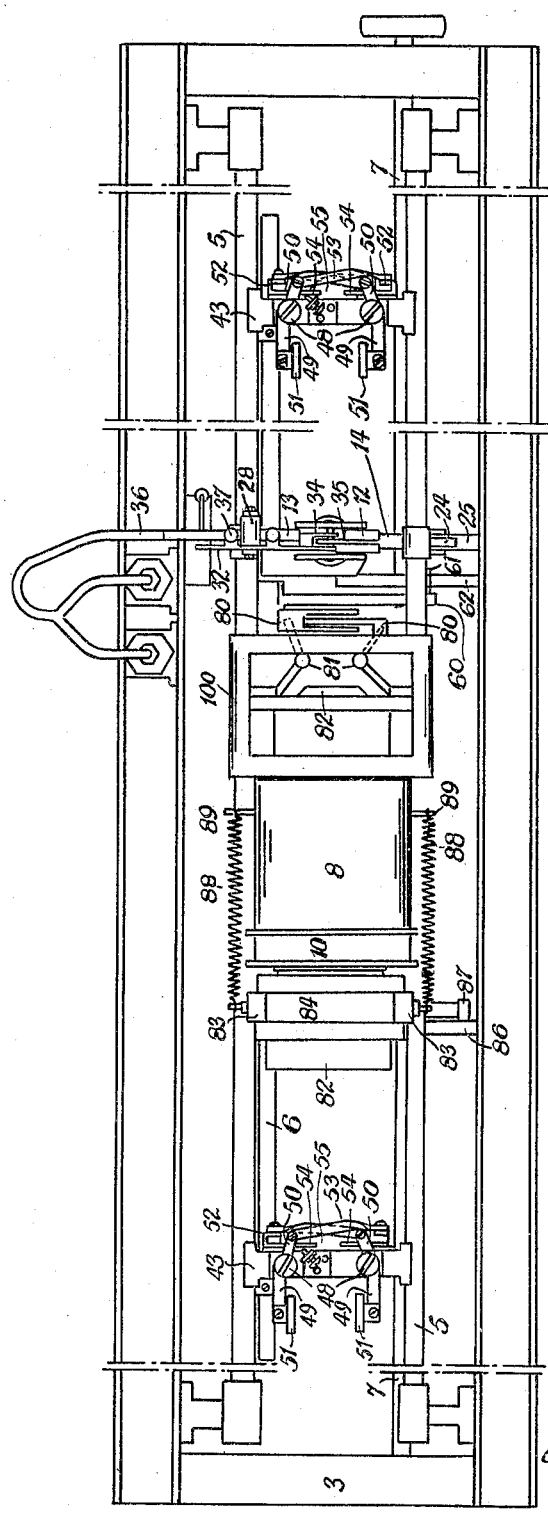
Fig. 2 is a plan view of Fig. 1.
Figure 3:
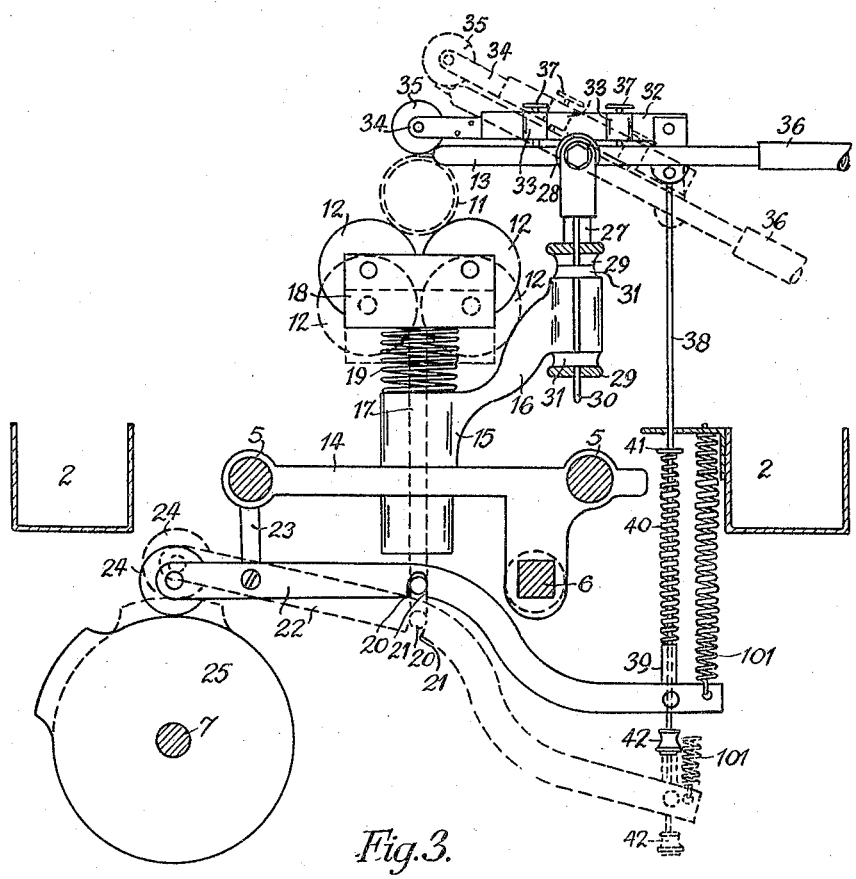
Fig. 3 is a sectional end elevation on the line A—B of Fig. 1 looking from the left and on a larger scale.

At a point in front of the chuck 100 are mounted the rollers 12 and the jet nozzle 13 (Figs. 1, 2 and 3). Between the guide rods 5 is fixedly secured a supporting bar 14 which in turn carries a sleeve 15 having an upwardly extending bracket 16 formed thereon. The sleeve 15 forms a guide for a vertically movable rod 17 which at its upper end supports bearing members 18 for the freely rotatable metal rollers 12. The rod 17, members 18 and rollers 12 are normally urged upwardly by means of a coiled spring 19 arranged between the upper end of sleeve 15 and the bearing members 18, but the extent of upward movement is limited by the engagement of a pin 20 on the lower end of rod 17 in a slot 21 formed in the underside of a bar 22 pivotally mounted on a downward extension 23 from bar 14. One end of bar 22 carries a roller 24 which engages a cam 25 on the camshaft 7, whereby the bar 22 may be rocked from the position shown in full lines in Fig. 3 to that shown in dotted lines in that figure for a purpose yet to be described. A tension spring 101 is connected between the end of bar 22 away from roller 24 and a fixed point on the machine to maintain roller 24 in contact with the cam 25.

On the upper part of the bracket 16 is formed a sleeve 26 which supports a rod 27 and the upper end of this rod 27 forms a bearing for a rotatable roller 28. The rod 27 is a screw threaded and is adapted for vertical adjustment in sleeve 26 by means of lock nuts 29 and guide pins 30 fixed to the rod 27 slide in apertures in lugs 31 on the sleeve 26 to prevent rotation of the rod 27 in the sleeve 26. A bar 32 pivotally mounted on the axis of roller 28 is provided with a pair of laterally extending lugs 33 intermediate its length and a fork 34 at its end which forms a bearing for a freely rotatable roller 35 which in the operative position shown in full lines in Fig. 3, runs upon the upper surface of the length of glass tubing 11 to be cut. Through an aperture in the rollers 28 passes the jet nozzle 13 connected at one end with the usual gas supply pipe 36 and provided at the other end with the usual flame jet producing aperture. The lugs 33 on the bar 34 serve to receive clamping screws 37 which hold the jet nozzle 13 in position and permit adjustment of the direction of the flame produced by the jet relatively to the roller 35. For ordinary purposes the jet is arranged to project a flame in a direction which is substantially tangential to the roller 35. The bar 34 is pivotally connected at its rear end with a downwardly extending rod 38 which at the lower end passes through a guide sleeve 39 pivotally connected with the free end of bar 22. The rod 38 is normally urged upwards by a light spring 40 arranged between a ring 41 on the rod and the guide sleeve 39, so that the roller 35 is held constantly in contact with the surface of the glass tubing 11. A screwed nut 42 is provided at the lower end of rod 38 to limit the extent of upward movement of said rod under the pull of spring 40.

It will readily be seen that as the glass tubing 11 is rotated by the chuck 100 during the cutting operation any excentricity of rotation due to the tubing being bent, or any irregularity in the shape of the surface of the tubing, will result in corresponding movement of roller 35 and bar 32 and therefore of the jet nozzle 13 and the cutting flame, and the angle of incidence of the flame upon the surface of the glass tubing will remain constant. Furthermore the metal rollers 12 being yieldingly mounted as described above, they also follow any uneven movements of the surface of the glass tubing as this rotates. Thus a uniformly good quality cut is ensured.

The apparatus illustrated also embodies means for feeding a length of tubing intermittently through the chuck 100 so that a long piece of tubing may be cut into a number of pieces of predetermined length.

The feeding means comprises two pairs of automatically operated grippers (Figs. 1, 2, 4 and 5) arranged one before and one behind the chuck 100, these grippers being mounted for reciprocating movement in unison longitudinally of the machine.

Figure 4:
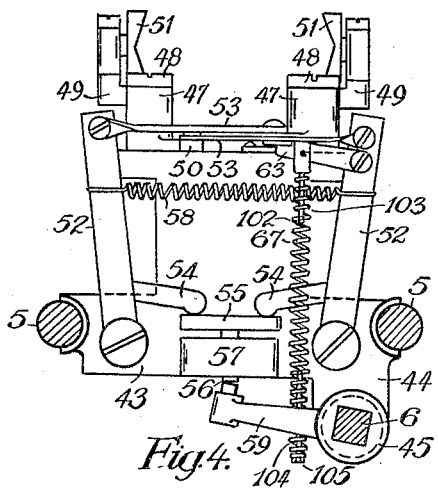
Figs. 4 and 5 are views in alternative positions of devices for gripping the glass tubing to be cut, to intermittently feed same.
Figure 5:
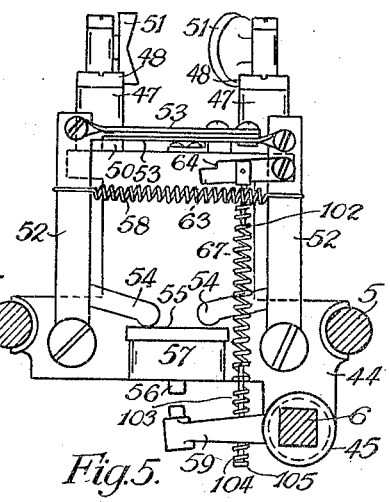
Figure 6:
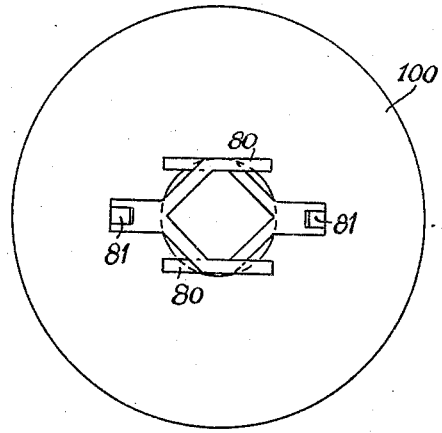
Figs. 6 and 7 are alternative views illustrating the form of rotating chuck employed.
Figure 7:
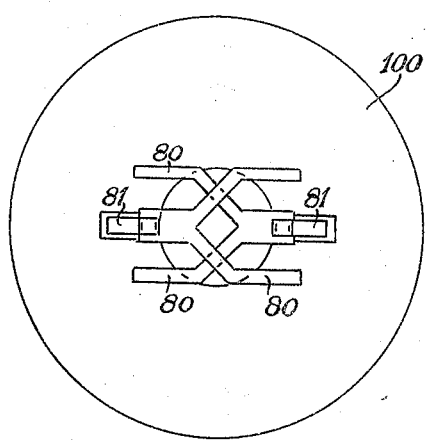

The grippers comprise sliding members 43 adapted to slide longitudinally of the machine between the guide rods 5 (see Figs. 4 and 5). The members 43 are each provided with downward extensions 44 which house bushes 45 capable of rotational but not translational movement in the lugs 44. The bushes 45 are clamped in adjustable manner by means of screws 46 to the ends of the square shaft 6 referred to above, and the latter being mounted for longitudinal movements in a manner yet to be described, the members 43 are constrained to move therewith. Upon the members 43 are carried pillars 47 which are rotatable about pivot pins 48 on the members 43. The pillars 47 are provided with radial arms 49, 50 on substantially diametrically opposite sides, and the arms 49 support gripping pads 51 while the arms 50 are connected with means for rotating the pillars 47 and arms 49 about the pins 48 to open and close the pads 51.

The means for opening and closing the pads 51 comprises levers 52 pivoted at their lower ends on members 43 and connected at their upper ends through links 53 with the arms 50, the left hand lever 52 in the drawings (Figs. 4 and 5) being connected with the arm 50 of the right hand pillar 47 and vice versa. The levers 52 are rocked outwards about their pivots through arms 54 rigid with said levers and extending with their free ends over a plate 55 carried on a vertical pin 56 mounted for vertical movement in a guide aperture in a lug 57 extending from member 43, and are rocked inwards by a spring 58 connected between said levers 52, when the plate 55 is lowered.

The raising and lowering of plate 55 and pin 56 at appropriate times is effected through an arm 59 rigid with and extending laterally from the bush 45 the end of said arm 59 engaging beneath the lower end of pin 56. The bush 45 and arm 59 are moved to raise the pin 56 by rocking the square shaft 6 and this movement is effected automatically through the medium of a lever 60 (Fig. 1) having a square aperture at one end to engage over shaft 6 and an anti-friction roller 61 at the other end which engages a cam 62 of the camshaft 7. As stated above, the gripping devices are moved longitudinally of the machine by sliding movement of the square shaft 6 and since the lever 60 must remain with its roller on cam 62 it is necessary for shaft 6 to slide in the square aperture in the end of lever 60. To permit this sliding movement of shaft 6 to take place with a minimum of resistance, an arrangement is employed whereby lever 60 is permitted to return to its normal position immediately the grippers 51 have been opened, the latter being held open until required to close to grip the tubing.

Upon one of the levers 52 is pivoted an arm 63 having a notch 64 formed in its upper edge. The arm 63 is connected with a rod 102 passing through an aperture in arm 59 and this rod 102 is surrounded by two spiral springs 103 and 104, the former 103 extending between the arms 65 and 59 and the latter 104 between arm 59 and a nut 105 on the lower end of the rod 102.

When the arm 59 is lifted and the pads 51 opened, the spring 103 is compressed and arm 63 lifted to a position where notch 64 engages behind the edge of the arm 50 connected with the opposite lever 52 whereby both levers 52 are held against movement about their pivots on members 43 when plate 55 is lowered. Thus the pads 51 are prevented from closing.

When however the pads 51 are required to close, the roller 61 on lever 60 registers with a depression on cam 62 and the shaft 6 is rocked slightly under the pull of a strong tension spring 66 (Fig. 1) connected between lever 60 and a point on the frame of the machine in a direction which lowers lever 59. Spring 104 is thereby compressed and rod 102 drawn downwards to withdraw arm 63 from engagement with the arm 50 whereupon the levers 52 swing together under the pull of spring 58 and pads 51 close.

The means for imparting longitudinal reciprocating movements to the square shaft 6 comprises a cam 67 on the rotating cam shaft, a lever 68 pivoted at 69 on the machine and having a laterally projecting pin and roller 70 intermediate its length which engages the cam 67, and a return spring 71, a second pivoted lever 72 pivoted at 73 adapted to be rocked by lever 68 through a connecting link 74, a clamp 75 on the square shaft 6 and a short link 76 connected between lever 72 and the clamp 75. Upon the lever 72 is formed an arc shaped extension 77 the arc of which lies on the circumference of a circle struck about the centre 73, and with this arc-shaped member co-operates a brake member 78 adjustable between two collars 79 on the square shaft 6.

The length of glass tubing is gripped in the rotating chuck 100 by means of a pair of relatively movable members 80. These members 80 are pivotally connected with a pair of bell crank levers 81 pivotally mounted in bearings within the chuck, and one arm of each bell crank extends through an aperture in the face of the chuck. The bell crank levers are adapted to co-operate with cam surfaces on a member 82 movabe longitudinally within the chuck, by means of a fork 83 engaging in a groove 84 in the member 82, said fork being pivoted at 85 and rocked when required by means of a cam 86 on the camshaft 7 which cam engages a roller 87 on the pivoted fork 83.

The member 82 is normally held in the forward position or to the right in Fig. 1 by means of springs 88 connected between the ends of the fork 83 and pins 89 on the chuck body, where the bell crank levers 81 are rocked into the position to cause the members 80 to engage and grip the glass tubing to rotate it with the chuck.

When the glass tubing in course of being cut is to be fed through the chuck the jet nozzle 13 and cooling rollers 12 are temporarily removed from their operative positions. This is effected through the cam 25 which rocks lever 22 about its pivot on member 23 to draw the rod 17, bearing members 18 and rollers 12 downwards against the spring 19 and rod 38 downwards against spring 40 to rock the jet nozzle 13, arm 34 and roller 35 about the axis of roller 28.

In operation after a cut has been made, the rotation of cam shaft 7 operates through cams 86, 25, 62 and 67 to open the chuck to release the tubing from the grip of members 80, to raise the jet nozzle 13 and guide roller 35, lower the cooling rollers 12, rock square shaft 6 to open gripper pads 51 and through the lever system 68, 74, 72, 76 to cause shaft 6 to move to the left in Fig. 1.

The movement of shaft 6 to the left always terminates at the same point. When shaft 6 has reached its extreme position, the roller 61 on lever 60 drops into a depression in cam 62 and the catch 63 is drawn down and the gripper pads 51 permitted to grip the length of tubing 11 at each end of the chuck preparatory to feeding it forward.

The lever system 68, 74, 72, 76 is now permitted to rock under the pull of spring 71 in the reverse direction and square shaft 6 moves to the right taking with it the grippers 43, 51 and the tubing 11. As the shaft 6 moves to the right the brake member 78 moves with it until frictional contact between said brake member and the arc-shaped surface 77 takes place, whereupon movement of shaft 6 ceases owing to the jamming action between 78 and 77. The braking device described enables the shaft 6 to be brought to a standstill without shock, but in the correct position according to the length of tubing to be cut off and the setting of brake member 78 on shaft 6, the absence of chock being due to the frictional sliding contact which takes place for a short period before members 78 and 77 jam together. Cam 86 now permits fork 83 and member 82 to move under the pull of springs 88 to close members 80 and cause the tubing to be gripped in the rotating chuck between members 80. Cam 25 now moves to permit bar 22 to rock and rollers 12 are raised and roller 35 lowered into contact with the rotating tubing 11 and the cutting off of the desired length of tubing is effected.

I claim:

1. Apparatus for cutting glass tubing into lengths comprising means for rotating a length of glass tubing to be cut, a pivotally mounted flame producing jet nozzle and means connected with the nozzle adapted to contact with the surface of the glass tubing to move the nozzle about its pivot in correspondence with variations in the shape of the tubing, and cooling rollers adapted to contact with the heated surface of the tube in the region of the line of application of the flame.

2. Apparatus for cutting glass tubing into lengths comprising means for rotating a length of glass tubing to be cut, a pivotally mounted flame producing jet nozzle, an arm rigidly connected with the nozzle a guide roller in bearings on said arm and adapted to roll on the surface of the tubing to be cut, and cooling rollers adapted to contact with the heated surface of the tube in the region of the line of application of the flame.

3. Apparatus for cutting glass tubing into lengths comprising means for rotating a length of glass tubing to be cut, a pivotally mounted flame producing jet nozzle, means connected with the nozzle and adapted to contact with the surface of the glass tubing to move the nozzle about its pivot in correspondence with variations in the shape of the tubing and cooling rollers adapted to rotate by contact with the surface of the tubing, yielding bearings for said rollers and means operating upon the yielding bearings to urge the rollers into contact with the surface of the glass tubing.

4. Apparatus for cutting glass tubing into lengths comprising a rotating chuck for rotating a length of glass tubing, means for intermittently releasing the chuck jaws, reciprocating gripping devices for feeding the tubing intermittently through the chuck, a pivotally mounted flame producing jet nozzle, an arm rigidly connected with the nozzle a guide roller in bearings on said arm and adapted to roll on the surface of the tubing to be cut, and cooling rollers adapted to contact with the heated surface of the tube in the region of the line of application of the flame.

5. Apparatus for cutting glass tubing into lengths comprising a rotating chuck for rotating a length of glass tubing, means for intermittently releasing the chuck jaws, reciprocating gripping devices for feeding the tubing intermittently through the chuck, a pivotally mounted flame producing jet nozzle, an arm rigidly connected with the nozzle and a guide roller in bearings on said arm and adapted to roll on the surface of the tubing to be cut, and means for moving the pivoted flame nozzle and the guide roller therefor from the working position during the time that the glass tubing is being fed through the chuck.

In testimony whereof I have signed my name to this specification.

ERNEST ASHFORD.